US 8,112,479 B2

(12) United States Patent
Guan (10) Patent No.: US 8,112,479 B2
(45) Date of Patent: Feb. 7, 2012

(54) METHOD, SYSTEM AND DEVICE FOR ESTABLISHING A PEER TO PEER CONNECTION IN A P2P NETWORK

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 12/403,519

(22) Filed: Mar. 13, 2009

(65) Prior Publication Data

US 2009/0177772 A1 Jul. 9, 2009

Related U.S. Application Data

(63) Continuation of application No. PCT/CN2007/070155, filed on Jun. 21, 2007.

(30) Foreign Application Priority Data

Sep. 14, 2006 (CN) .......................... 2006 1 0127232

(51) Int. Cl.
*G06F 15/16* (2006.01)
(52) U.S. Cl. ........ 709/204; 709/203; 709/205; 709/217; 709/218; 709/250
(58) Field of Classification Search .......... 709/203–205, 709/217, 218, 250
See application file for complete search history.

(56) References Cited

U.S. PATENT DOCUMENTS

| 7,089,301 | B1 | 8/2006 | Labio et al. |
| 7,437,440 | B2 * | 10/2008 | Manion et al. ................ 709/223 |
| 7,454,480 | B2 | 11/2008 | Labio et al. |
| 7,509,372 | B2 * | 3/2009 | Dutta et al. .................... 709/203 |
| 7,533,161 | B2 * | 5/2009 | Hugly et al. .................... 709/220 |
| 7,536,471 | B2 * | 5/2009 | Oliver et al. .................... 709/232 |
| 7,805,518 | B1 * | 9/2010 | Kamvar et al. ................ 709/227 |
| 7,849,203 | B2 * | 12/2010 | Berkey et al. .................. 709/229 |
| 2003/0028623 | A1 | 2/2003 | Hennessey et al. |
| 2003/0212710 | A1 * | 11/2003 | Guy .......................... 707/104.1 |

(Continued)

FOREIGN PATENT DOCUMENTS

CN 1815981 A 8/2006

(Continued)

OTHER PUBLICATIONS

Bin et al., "Bit Torrent Traffic Control Strategy Based on Access Control List," *Computer Applications and Software*, 23(5) (May 2006).
Fan, "An Auto-clustering Peer-to-Peer System Based on Classification Search," *Journal of Wuhan University of Technology*, 28(7) (Jul. 2006).

(Continued)

*Primary Examiner* — Michael Y Won
*Assistant Examiner* — Van Kim T Nguyen
(74) *Attorney, Agent, or Firm* — Leydig, Voit & Mayer, Ltd.

(57) ABSTRACT

A method and system for establishing a peer to peer connection in a P2P network and a peer device in the P2P network, wherein the method comprises of the following: (1) a management node in the P2P network receives a resource request; (2) the management node selects one or more peers which meet the demand from a resource list established previously according to the logon information of the other peers in the P2P network to return it to a resource request peer; (3) the connection is established between the said resource request peer and the said peers which meet the demand.

15 Claims, 5 Drawing Sheets

U.S. PATENT DOCUMENTS

| | | |
|---|---|---|
| 2005/0028012 A1 | 2/2005 | Amamiya et al. |
| 2005/0120073 A1* | 6/2005 | Cho .............................. 709/201 |
| 2006/0173940 A1* | 8/2006 | Guntupalli et al. ........... 707/206 |
| 2009/0265473 A1 | 10/2009 | Hydrie et al. |

FOREIGN PATENT DOCUMENTS

| | | |
|---|---|---|
| CN | 1822548 A | 8/2006 |
| EP | 1 821 487 A1 | 8/2007 |
| WO | WO 02/15035 A2 | 2/2002 |

OTHER PUBLICATIONS

Bindal et al., "Improving Traffic Locality in BitTorrent via Biased Neighbor Selection," *Proceeding of the 26$^{th}$ IEEE International Conference on Distributed Computing Systems*, 1-9 (Jul. 2006).

Qureshi, "Exploring Proximity Based Peer Selection in a BitTorrent-like Protocol," Internet Citation, 1-10 (May 7, 2004) http://pdos.csail.mit.edu/6.824-2004/reports/asfandyar.pdf [retrieved on Jul. 11, 2006].

\* cited by examiner

METHOD, SYSTEM AND DEVICE FOR ESTABLISHING A PEER TO PEER CONNECTION IN A P2P NETWORK

CROSS-REFERENCE TO RELATED APPLICATIONS

This application is a continuation of International Patent Application No. PCT/CN2007/070155, filed Jun. 21, 2007, which claims priority to Chinese Patent Application No. 200610127232.9, filed Sep. 14, 2006, both of which are hereby incorporated by reference in their entirety.

FIELD OF THE INVENTION

The present invention relates to the technical field of communications, and in particular to a method, system and device for establishing a peer to peer connection in a P2P network.

BACKGROUND OF THE INVENTION

In recent years, the Peer-to-Peer (abbreviated as P2P) rapidly becomes one of hot topics in the computer industry. The P2P is a distributed network. Participants in the P2P network share a part of their hardware resources, including: processing capability, storage capability and network connection capability of participants. The shared resources require the network to provide services and content that can be accessed directly by other peers via no intermediate entities. The participants in the network are not only providers (Servers) of the resources (services and content) but also obtainers (Clients) of the resources (services and content).

The P2P technique draws great attention at present. The utilization of software such as BT, eMule and PPLive makes people foresee the foreground of the P2P technique in telecommunications field. The soul of the P2P network lies in its loose management mode. This mode gives more freedom to users but it is difficult to manage. For example, because there are a lot of users in the P2P network, a lot of search results may be obtained if a user performs a search. The majority of the search information may be junk information except a minority of useful information. Because it is difficult for the P2P network to order the search results due to lack of concentrated management, it is inevitable for the users to be surrounded by the junk information. Also, due to the randomness of joining, usage and quit of the P2P peers, the P2P network becomes unstable and cannot therefore provide quality of service for the users, which influences the commercialization of this technique in telecommunications field. In addition, it is well-known that users in the P2P network may occupy a large amount of network bandwidths, which influences bandwidth usage of non-P2P network users in the same network. For example, at present users connected with the P2P network occupy a large amount of network bandwidths, which influences bandwidth usage of other users in the telecommunications network and results in that the operators such as China Telecom have to disable the port of the users connected with the P2P network.

At present, popular P2P software BitTorrent (abbreviated as BT) has had certain management capabilities. The BT system needs a Web server, which is also called Tracker. The Tracker is responsible for maintaining a resource list and updating resource occupied by the respective peers periodically. All peers of the P2P network can obtain resource distribution as required only by query in the Tracker. When a connection is established between a peer and the Tracker, the Tracker collects information from all downloaders and helps to match them. Because the Tracker provides very limited user list information, a user cannot determine which peers in the list can actually provide a service. Therefore, the user needs to try to establish connections to all objects in the list, and always maintains the connections so as to wait for a "possible" service provided by an opposite party. In other words, each user should establish around a hundred of external connections, however, usable links are few, which not only occupies the user's resource but also wastes network bandwidth. Furthermore, the Tracker, connected with the respective peers, via a fixed port, is subject to external attacks.

SUMMARY OF THE INVENTION

An aspect of embodiments of the present invention provides a method and system, to improve the management capability of the P2P network and to reduce the network bandwidth occupancy of the P2P application, so that users can search in the P2P network rapidly for useful information.

Another aspect of embodiments of the present invention provides a peer device in a P2P network, so as to establish a peer-to-peer connection in the P2P network and to reduce the network bandwidth occupancy of the P2P application, so that users can search in the P2P network rapidly for useful information.

A method for establishing a peer-to-peer connection in a P2P network according to an embodiment of the present invention includes (1) receiving a resource request by a management node in the P2P network; (2) selecting at least one peer meeting requirements from a resource list and returning the selected peer to a resource request peer by the management node, the resource list being pre-created according to register information of peers other than the management node in the P2P network; and (3) establishing a connection between the resource request peer and the peer meeting requirements.

A system for establishing a peer-to-peer connection in a P2P network according to an embodiment of the present invention includes (1) a management node, adapted to select at least one peer meeting requirements from a resource list and to return the selected peer to a resource request peer on receiving a resource request from the resource request peer, the resource list being pre-created according to register information of peers other than the management node in the P2P network; and (2) the resource request peer, adapted to request the resource of the management node and to establish a connection between the resource request peer and the peer meeting requirements, after obtaining the peer meeting requirements provided by the management node.

A peer device in a P2P network according to an embodiment of the present invention includes (1) a register information obtaining unit, adapted to receive register information of peers other than the peer device in the P2P network; (2) a resource list creating unit, adapted to create a resource list according to the register information, the resource list comprising resource information and capability information of the peers; (3) a message receiving unit, adapted to receive a resource request from a resource request peer; and (4) a resource selecting unit, adapted to select at least one peer meeting requirements from the resource list and to return the selected peer to the resource request peer.

According to an embodiment of the present invention, a peer device in a P2P network, the peer being selected from or added in a same class of peers, includes (1) a resource storing unit, adapted to receive resource registered by peers of a same class, and to store the resource of the peers of the same class and information of the peers of the same class; and (2) a resource matching unit, adapted to receive a resource request from the peers of the same class, to select a peer meeting requirements from the resource storing unit and to return the selected peer to the peers of the same class.

It can be seen from the above solutions that an arbitrary peer in a P2P network is selected as a management node to manage connection between respective peers in the P2P network, and the management node performs resource match according to information of other peers obtained from the network, selects one or more peers meeting resource requirements from a resource list, and sends the selected peer(s) to a resource request peer user, thereby enhancing the manageability of the P2P network. The resource can be downloaded effectively if only a connection is established between the resource request peer and the one or more peer meeting requirements selected by the management node, so that the occupation of network bandwidth due to the usage of P2P is reduced and the user can search out useful information in the P2P network rapidly.

DETAILED DESCRIPTION OF THE INVENTION

Embodiments of the present invention are further described in detail with reference to the attached drawings as follows.

Figure 1:
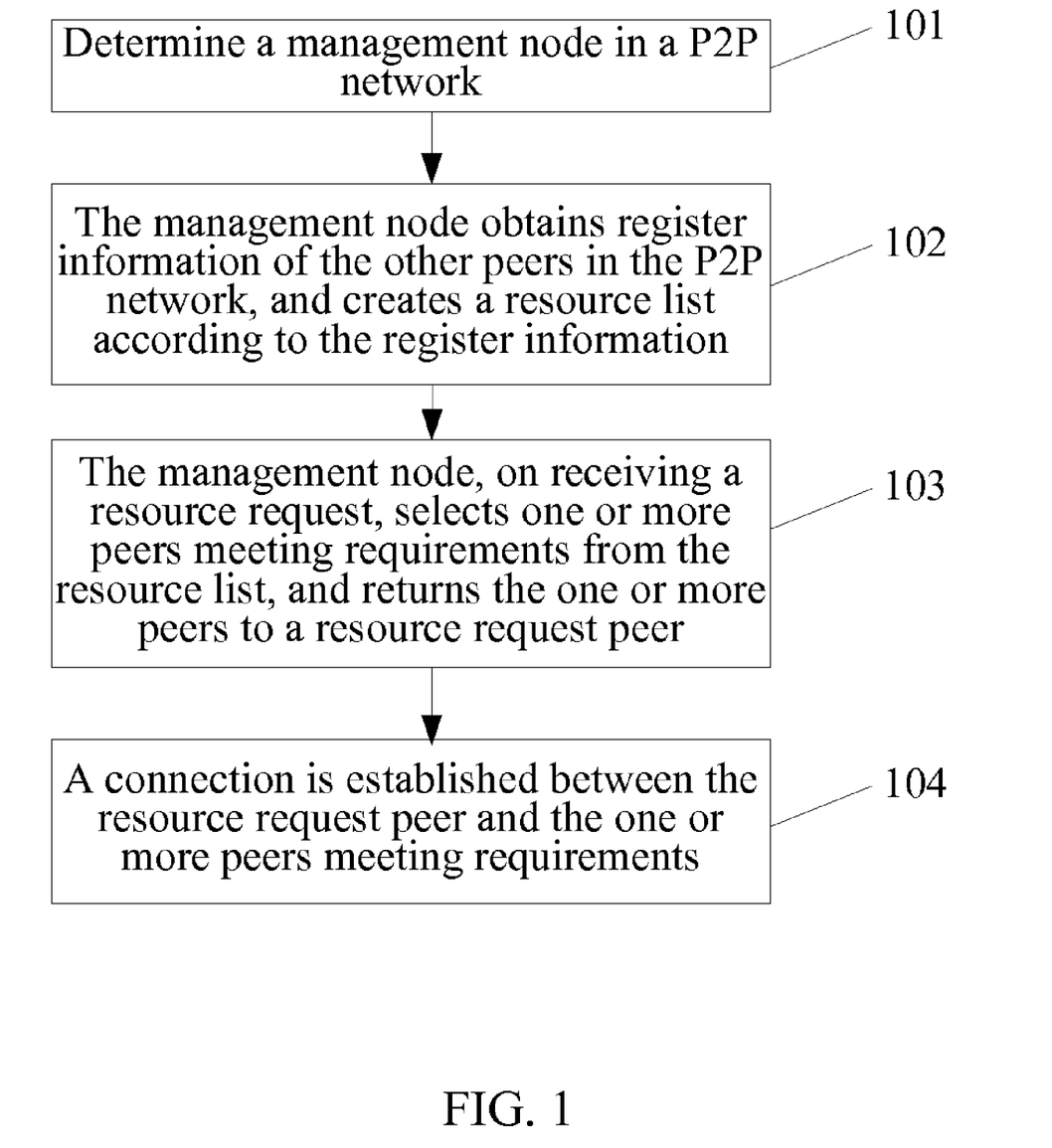
FIG. 1 is a flowchart of a method for establishing a peer-to-peer connection in a P2P network according to an embodiment of the present invention.

Referring to FIG. 1, a process of a method for establishing a peer-to-peer connection in a P2P network according to an embodiment of the present invention includes the steps as follows.

101. Determine a management node in a P2P network.

Among all peers in the P2P network, only one peer may be selected as the management node for managing all the peers in the P2P network. Alternatively, the peers in the P2P network are first classified, and a management node is determined respectively among each class of the peers. The selection of management node may be made in a designated manner (designated by a manager of the P2P network) or in a vote manner (voted by the peers). Theoretically, any peer in the P2P network may act as the management node. In consideration of network stability, a server of an operator in a trusted domain may be preferably selected as the management node. The management node may be determined in the following rules.

(1) Select the management node preferably from super nodes;

(2) For a P2P system in a trust mode, preferably select a peer having a high trust score;

(3) Under an equal condition, preferably select a peer which has a long P2P network access time, fast speed and strong processing capability.

In addition, due to the specialty and significance of the management node in the P2P network, a backup mechanism may be adopted, i.e., a backup management node is determined in the P2P network at the same time. The backup management node needs to operate as follows.

(1) Periodically synchronize a resource list and a user list in the primary management node;

(2) Monitor the operational aspect of the primary management node;

(3) When the primary management node operates abnormally, the backup management node becomes the primary management node, of which the other peers in the P2P network are informed. If the management node is generated by voting, the voting of a new backup management node needs to be performed.

Alternatively, if there are many management nodes determined in the P2P network, a backup management node may be determined for each of the management nodes correspondingly.

If the management node is generated in a designated manner, a new backup peer needs to be designated.

The selection rule for the backup management node is the same as that for the primary management node.

It should be noted that in order to ensure data accuracy during a switch between the primary and backup management nodes, the primary and backup management nodes may be synchronized with each other periodically. A synchronization cycle may be set according to the P2P network environment, the number of users, connection speed, etc. The embodiment of the present invention does not limit the value of the synchronization cycle.

102. The management node obtains register information of the other peers in the P2P network, and creates a resource list according to the register information.

The management node may obtain a user list from a super node or a Tracker server, notifies its status to the users in the user list after obtaining the user list, informs all peers in the list of its IP address and port, and requests the users to register with the management node.

If a new user joins the P2P network, the super node or the Tracker server announces the status, IP address and port of the management node to the newly joined user.

The peers in the user list, on receiving the announcement from the management node, registers with the management node their resource, capability and IP address that the peers share with the P2P network. The resource mainly includes: duplicable files and media stream. The capability includes information such as CPU, memory, hard disk, uplink and downlink bandwidth designated for use in the P2P procedure. For ensuring the validation of the peers, the management node performs a connection test on the peers in the user list, and adds those passing the test in the resource list.

103. The management node, on receiving a resource request, selects one or more peers meeting requirements from the resource list, and returns the one or more peers to the resource request peer.

If a peer needs to download, the peer requests the resource of the management node. The management node selects one or more peers meeting requirements from the resource list, returns the one or more peers to the resource request peer, and updates capability information of the peer(s) meeting requirements in the resource list, e.g., removes the used capability from current capability information of the one or more peers.

For a P2P system in a trust mode, the management node may preferably select a peer having a high score.

104. A connection is established between the resource request peer and the peer meeting requirements.

During or after the establishment of the connection, the management node may also perform detection management on the two-party peers connected with each other. The detection management includes the following aspects.

After the connection is established, the management node may also detect the state of the two parties connected with each other periodically, so as to ensure the two parties can establish an effective connection. If the management node detects that the state of the peer meeting requirements as abnormal, the management node selects another peer meeting requirements from the resource list, returns the selected another peer meeting requirements to the resource request peer, and updates state information of the abnormal peer. If the management node detects that the state of the resource request peer as abnormal, the management node takes back the resource and capability of the peer meeting requirements, and informs all peers connected with the resource request peer to disconnect the connection.

During the establishment of connection between the two peers in the P2P network, if serviceable resource or capability of the peer that has established the connection has exhausted, a capability exhaustion notification may be sent to the management node. On receiving the capability exhaustion notification, the management node ceases allocating a task to this peer, and updates the resource and capability of this peer in the resource list. After this peer resumes the capability, this peer sends a capability resumption notification to the management node. On receiving the capability resumption notification, the management node updates the resource and capability of this peer in the resource list. In this way, it is further ensured that the connection can be established effectively between the peers, and resource utilization efficiency is increased.

After completing resource downloading or before quitting the P2P network, the peer informs the management node. In the case of completing the resource downloading, the management node updates the resource and capability of the peer in the resource list. In the case of quitting the P2P network, the management node deletes information of the peer in the resource list and updates the user list.

It can be seen that the method according to the embodiment of the present invention can, by the management node managing the P2P network, update resource allocation in time, reduce the occupation of traffic of a bearer network using the P2P, reduce resource search time and increase resource utilization efficiency greatly.

In the embodiment of the present invention, a management node is introduced in the P2P network. The management node is determined by selection from peers or a management node is added through a certain policy, for connection management in the P2P network. The management includes but is not limited to the following functions: register and deregister of received shared resource (file, stream media), task scheduling between a peer/client (a peer requesting to download resource) and a peer/server (a peer providing resource to be uploaded), and state monitoring of peers. Therefore, the connectivity of the respective peers in the P2P network is ensured.

Furthermore, connections between each class of peers are managed respectively by setting multiple management nodes in the P2P network. These management nodes provide different connection ports for users, thereby preventing from attacks of illegal users.

Figure 2:
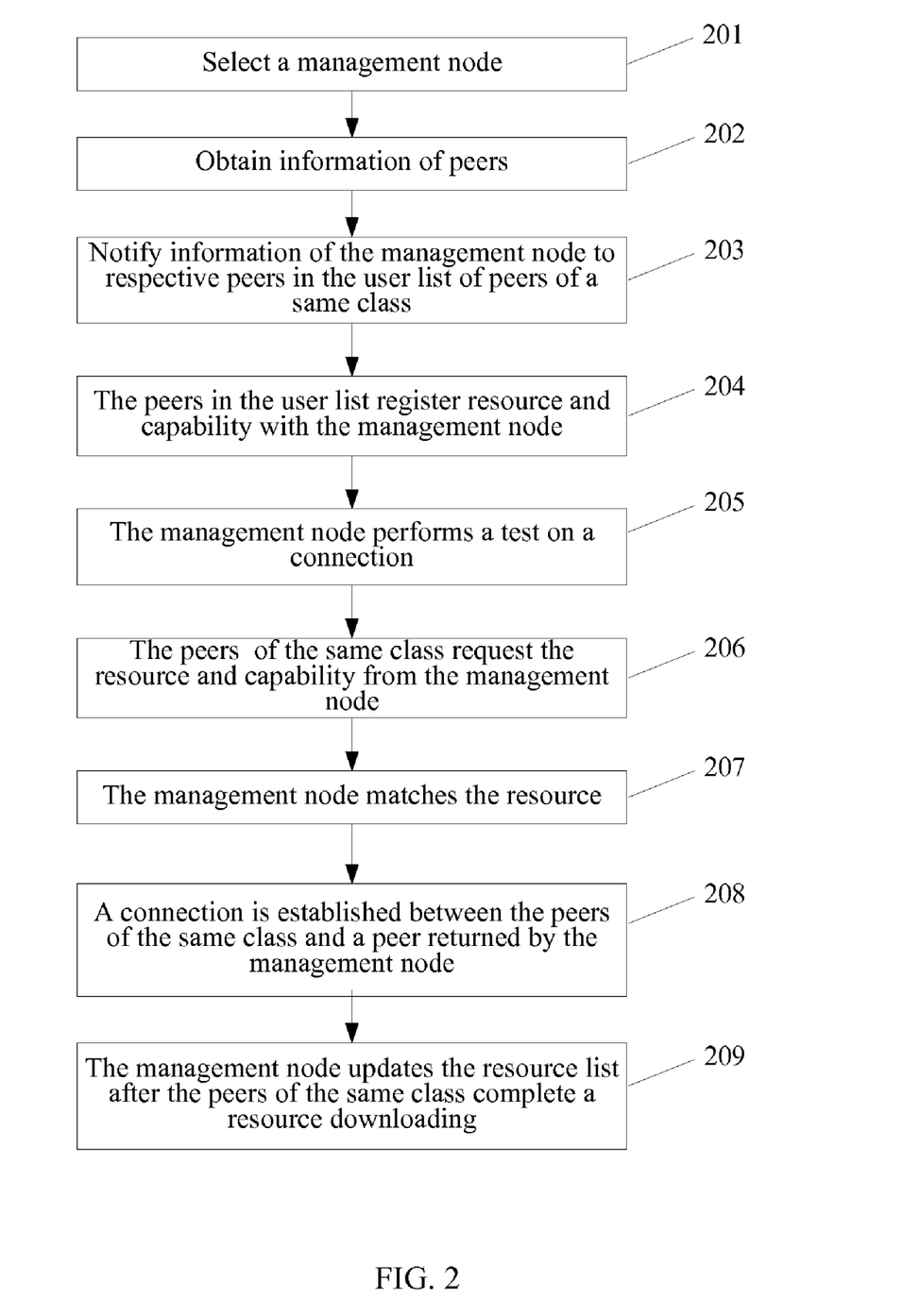
FIG. 2 is a flowchart of an example of a method for establishing a peer-to-peer connection in a P2P network according to an embodiment of the present invention.

FIG. 2 is a flowchart in which a method according to an embodiment of the present invention is used in IPTV. The embodiment takes the application of Video on Demand (VOD) in IPTV as an example. The flowchart includes the steps as follows.

201. Select a management node.

The P2P technique is introduced in the conventional IPTV media distribution network. The forwarding capability of respective peers is utilized to reduce the load of a Content Delivery Network (CDN) Server. In the VOD, users demanding the same program source are generally organized into a group, in which resource sharing is implemented. In the VOD, peers are classified according to selected programs, e.g., peers playing program 1 are deemed as the peers of a same class, and peers playing program 2 are deemed as the peers of a same class.

A management node is selected from or added in the peers of the same class. The management node is selected in the following rules.

If the P2P network (i.e., the number of peers in the P2P network) reaches a certain scale (the scale generally is usually 20 to 30 users, which is determined by those skilled in the art according to current traffic of the P2P network or experience, and the embodiment of the present invention does not limit the value of the scale), the management node is generated in the P2P network. The management node may be designated by the administrator of the P2P network or may be generated by voting. If the management node is designated by the administrator of the P2P network, it is proposed that a server of an operator in a trusted domain act as the management node. In this case, the management node is generated by adding a server to act as the management node in the peers of the same class by the operator.

The voting of the management node may comply with the following rules.

In a hybrid model of the P2P network, Super Nodes (SNs) have higher processing capabilities and longer online time than Ordinary Nodes (ONs). Therefore, the management node is selected preferably from the SNs.

For a P2P system in a trust mode, a peer having a high trust score is preferably selected. If the P2P network reaches a certain scale, a management server of the network administrator sorts the user list according to the trust scores, and the first and second peers act as a primary management node and a backup management node respectively.

If the peers have the same processing capabilities, a peer which has a long P2P network access time, fast speed and strong processing capability is preferably selected.

In a hybrid model of the P2P network, high-layer SNs do not need to be managed by the management node, and the management node is adapted to manage ONs below the layer of SNs. If there is a plurality of management nodes in the same SN, the management nodes support search in each other.

Generally, a node behind a Network Address Translation/Firewall (NAT/FW) does not act as a management node, because the node behind the NAT/FW needs to originate an external connection on its initiative if it needs to communicate with external devices.

In addition, if the processing capability of the management node is insufficient, the management node may be replaced or the P2P network is divided into two sub-networks.

202. Obtain information of peers.

After the management node of the P2P network is generated, the user list of the peers of the same class is collected from a Tracker server (a concentrated model of the P2P network) or an SN (a hybrid model of the P2P network).

203. Notify Information of the management node to respective peers in the user list of the peers of the same class.

The management node, on the collection of the user list, notifies its serving IP address and port to all peers in the list.

The tracker server or the SN records the IP address and port of the management node, notifies the status of the management node to a newly joined user when the new user joins the P2P network, and notifies the recorded IP address and port of the management node to the new user.

204. The peers in the user list register resource and capability with the management node.

In this case, the peers in the user list are all the same class of users.

In the P2P network, a node which registers resource and capability with the management node is called a peer/server, each node may be called a peer/server (a node uploading resource) or a peer/client (a node requesting to download resource). The peer/server registers its resource, capability and IP address that the peer/server shares with the P2P network with the management node. The resource mainly includes software information such as duplicable files and media stream. The capability refers to in-duplicable hardware information such as CPU, memory, space of hard disk, uplink and downlink bandwidth designated for use in the P2P procedure.

205. The management node performs a test on a connection.

The management node performs connection test on the connection between the management node and the peers of the same class in the user list according to the IP address provided by the peer/server, and adds the peers passing the test in a resource list.

206. The peers of the same class request the resource and capability from the management node.

A peer/client requests the resource and capability from the management node. The capability mainly refers to capability requirements for the peer/server, and generally uplink bandwidth that the peer/server can provide. If the peer/client has requirements for uplink bandwidth provided by the peer/server, the peer/client requests capability of the management node. Ordinary nodes request capability of the management node when downloading media streams.

207. The management node matches the resource, i.e., the management node selects a peer meeting requirements of a resource request peer from the resource list and returns the peer meeting requirements to the resource request peer, in particular: the management node, on receiving a resource and capability request from a peer/client, selects one or a group (multiple peer/servers cooperate with each other to complete a task, and the multiple peer/servers are called a group) of peers meeting requirements from the resource list and returns the selected one or the group to the peer/client; for example, if a user requires the first chapter of program 1 in VOD, the peers meeting requirements is a peer having the first chapter of program 1; for a P2P network in a trust mode, if multiple peers have the same download resource, the management node preferably considers a peer having a high score when selecting the peer/server.

It should be noted that the peer meeting requirements needs to meet not only resource download requirements but also requirements of capability of the peers of the same class. For example, in some streaming media download, a downloading peer has capability requirements for a peer providing resource (e.g., the uplink bandwidth of a peer providing resource download should meet certain requirements), and if the peer providing resource download does not provide sufficient capability, a connection between the two peers is not smooth, which will influence the user's experience.

208. A connection is established between the peers of the same class and the peer returned by the management node.

On receiving the one or group of peer/servers returned by the management node, the peer/client establishes a connection with the one or group of peer/servers. After the connection is established, the management node adjusts relevant capability information of the peer/server in the resource list, i.e., updates the resource list. For example, the used capability, etc., is removed from current capability information.

After the connection between the peer/server and the peer/client, the management node checks states of the two parties connected with each other periodically according to an interval, which may be set according to the number of current users and data traffic in the P2P network. A value of the interval is not limited in this embodiment. If detecting the state of the peer/server as abnormal, the management node selects a peer/server meeting requirements from the resource list again, returns the selected peer/server to the peer/client, and updates state information of the abnormal peer/server (modifies the state information as unavailable or removes the state information). If detecting the state of the peer/client as abnormal, the management node takes back the resource and capability of the peer/server, and informs all peer/servers connected with the abnormal peer/client to disconnect the connections.

It should be noted that during the download, if the resource downloaded by the peer/client reaches a P2P network minimum unit, the peer/client registers on its initiative resource and capability with the management node according to its own resource and capability. The P2P network minimum unit may be different in different P2P networks according to different files or streaming media downloaded by the user, and generally 7M or 8M. The P2P network minimum unit may be set according to the size of a file that is to be downloaded and the size of a memory that can be provided by the user. A value of the P2P network minimum unit is not limited in this embodiment of the present invention.

During the download, if the peer/server finds that its own capability will be exhausted, it informs the management node to cease allocating a new task, and after its own capability resumes to a certain value, informs the management node to allocate a new task to the peer/server. In addition, before quitting the P2P network, the peer/server or peer/client informs the management node to delete resource information of the peer/server or peer/client in the resource list, updates the resource list, and updates the user list, so as to reduce the disturbance of the P2P network.

209. The management node updates the resource list after the peers of the same class complete the resource download.

After the peer/client accomplishes the download task, the management node takes back various resources and capabilities in the resource list, including: resource and capability registered in the peer/server, and resource and capability registered dynamically with the management node during the download of the peer/client. In other words, the management node updates resource and capability information in the resource list.

In the method according to this embodiment, the management node is selected from or added in the peers of the same class in the P2P network, and the management node manages the peers of the same class. The management node registers peer information in the network. If a peer requests resource and capability, the management node performs resource match, detects connection states of the respective peers, and dynamically updates the resource list and the user list in the process from the start to the end of the download, thereby ensuring the availability of resource in the P2P network. If a peer quits the P2P network, the peer informs the management node, and the management node updates the user list, thereby reducing the disturbance of the network. In this embodiment, the connection between peers and the process of sharing network resource in the P2P network are described in detail for cases of the start and the end of a peer of the P2P network requesting to download resource and the course of downloading resource. The embodiment of the present invention does not exclude description of the connection between peers in other aspects, i.e., the process of downloading resource in the P2P network.

It can be seen that according to the embodiment of the present invention, multiple management nodes in the P2P network manage connections in each class of peers respectively. These management nodes provide different connection ports for users, thereby preventing from attacks of illegal users.

Further, in the process of downloading resource by a peer user, the management node detects the state of one of the peers of the same class and the peer state of the peers of the same class in a real time manner. If the management node detects the state of one of the peers of the same class as abnormal, the management node informs peers connected with the abnormal peer to disconnect the connection between the abnormal peer and the peers connected with the abnormal peer. If the management node detects a peer of the peers of the same class as abnormal, the management node updates state information of the abnormal peer to ensure the availability of resource and capability provided by each peer and the availability of each connection, thereby reducing the waste of network resource.

Further, in the download process of the user and in the case that a peer notifies of the capability exhaustion or quits the network, the management node updates the resource list and the user list in time to ensure the availability of current resource in the P2P network.

Further, a backup management node may be selected from the peers of the same class. If the primary management node fails, the backup management node replaces the primary management node to perform the management of the P2P network in order to ensure the stability of the P2P network.

Figure 3:
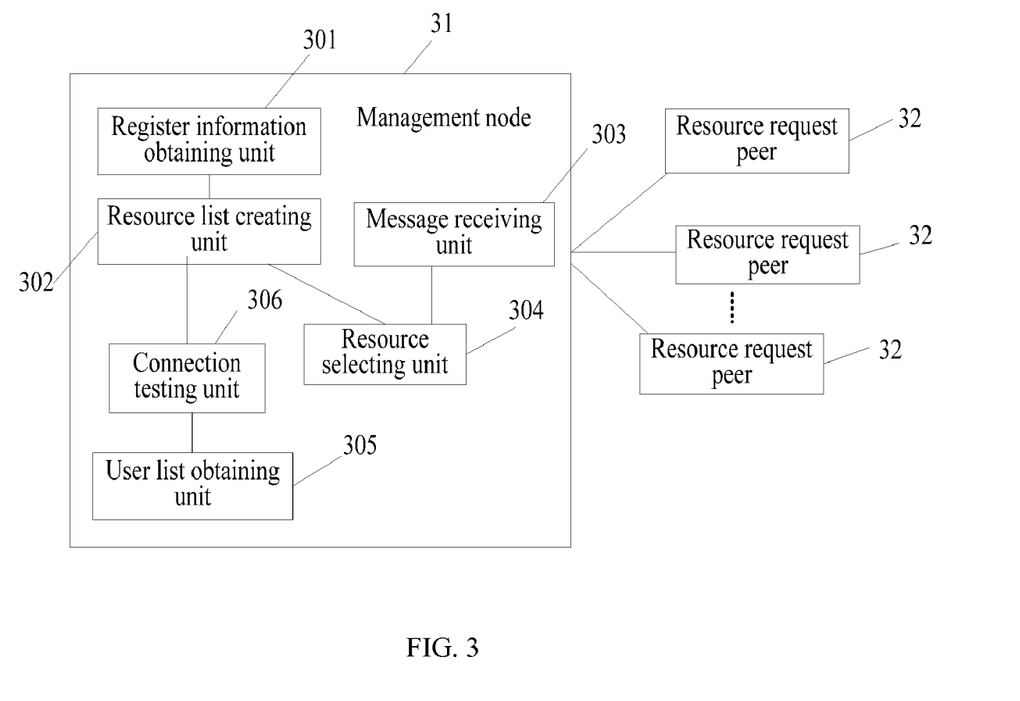
FIG. 3 is a principle block diagram of a system for establishing a peer-to-peer connection in a P2P network according to an embodiment of the present invention.

FIG. 3 is a principle block diagram of a system for establishing a peer-to-peer connection in a P2P network according to an embodiment of the present invention.

The system includes a management node 31 and multiple resource request or register peers 32. The management node 31 is adapted to obtain register information of other peers in the P2P network, to create a resource list according to the register information, and to select one or more peers meeting requirements from the resource list and to return the selected peer(s) to a resource request peer 32 on receiving a resource request from the resource request peer 32. The resource request peer 32 is adapted to request the resource of the management node, and to establish a connection between the resource request peer 32 and the peer(s) meeting requirements after obtaining the peer(s) meeting requirements provided by the management node.

The management node 31 includes: a register information obtaining unit 301, a resource list creating unit 302, a message receiving unit 303 and a resource selecting unit 304. The register information obtaining unit 301 is adapted to receive the register information of the resource request peers 32. The resource list creating unit 302 is adapted to create the resource list according to the register information, the resource list including resource information and capability information of the peers. The message receiving unit 303 is adapted to receive a resource request from a resource request peer 32. The resource selecting unit 304 is adapted to select the one or more peers meeting requirements from the resource list and to return the selected peer(s) to the resource request peer 32.

In order to ensure the availability of the peers in the resource list, a user list obtaining unit 305 and a connection testing unit 306 may be arranged in the management node 31. The user list obtaining unit 305 is adapted to obtain a user list in the P2P network, and to collect the user list from a Tracker server (concentrated P2P network) or an SN (a hybrid model of the P2P network). The connection testing unit 306 is adapted to perform a test on the connection between itself and the peers in the user list, and to add those peers passing the test in the resource list.

In the P2P network, there may be one management node, or there may be multiple management nodes for diverse classes of peers. In other words, a management node is set in each class of peers. In addition, in order to ensure the reliability of the operation of the management node, a backup management node may be set in the system. The management node and the backup management node may be generated in a designated manner or in a vote manner. For example, a management server is arranged in the P2P network, and the management server obtains information of the peers in the P2P network and determines the management node and the backup management node according to the information of the peers. The selection rules of the management node are described above and are not repeated here.

If a resource request peer 32 in the system needs to download resource, the resource request peer 32 requests the management node 31 for resource. The management node 31 selects one or more peers meeting requirements according to the request from the resource request peer 32 and returns the selected peer(s) to the resource request peer 32. In such a way, the resource request peer 32 can establish a connection to the peer(s) meeting requirements, to obtain required resource. A detailed process is described as the method according to the above embodiment of the present invention.

Figure 4:
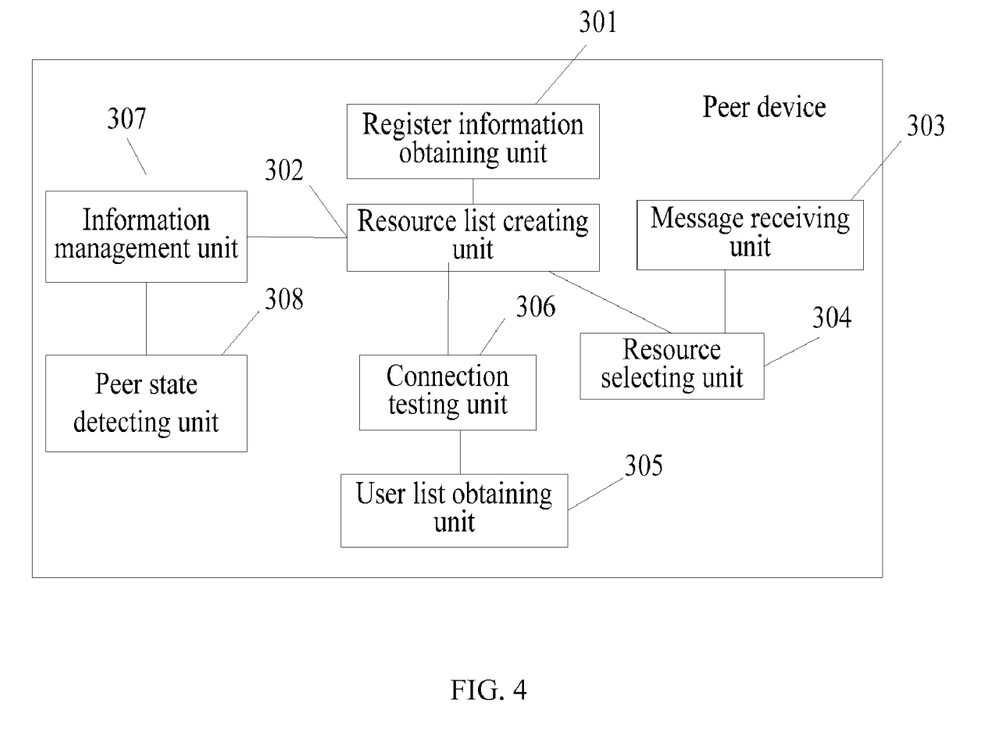
FIG. 4 is a structural diagram of a network device according to an embodiment of the present invention.

FIG. 4 is a structural diagram of a network device according to an embodiment of the present invention.

The network device includes a register information obtaining unit 301, a resource list creating unit 302, a message receiving unit 303 and a resource selecting unit 304.

The register information obtaining unit 301 is adapted to receive register information of resource request peers 32. The resource list creating unit 302 is adapted to create a resource list according to the register information, the resource list including resource information and capability information of the peers. The message receiving unit 303 is adapted to receive a resource request from a resource request peer 32. The resource selecting unit 304 is adapted to select the one or more peers meeting requirements from the resource list and to return the selected peer(s) to the resource request peer 32.

In order to ensure the availability of the peers in the resource list, a user list obtaining unit 305 and a connection testing unit 306 may be arranged in the network device. The user list obtaining unit 305 is adapted to obtain a user list in a P2P network, and to collect the user list from a Tracker server (concentrated P2P network) or an SN (a hybrid model of the P2P network). The connection testing unit 306 is adapted to perform a test on the connection between itself and peers in the user list, and to add those peers passing the test in the resource list.

In addition, an information management unit 307 and a peer state detecting unit 308 may be arranged in the network device. The information management unit 307 is adapted to update resource and capability information of a peer in the resource list according to the state of the peer. The peer state detecting unit 308 is adapted to detect the state of peers connected with each other. For example, the peer state detecting unit 308 sends a test message to the peers periodically, and if the peer state detecting unit 308 detects the state of a peer meeting requirements as abnormal, informs the resource selecting unit to reselect a peer meeting requirements and returns the reselected peer to the resource request peer; or if the peer state detecting unit 308 detects the state of the resource request peer as abnormal, informs the information management unit to take back and update the capability of the peer meeting requirements. The process of managing the resource and capability information of the peers in the resource list by the information management unit 307 is described as the method according to the above embodiment of the present invention.

Figure 5:
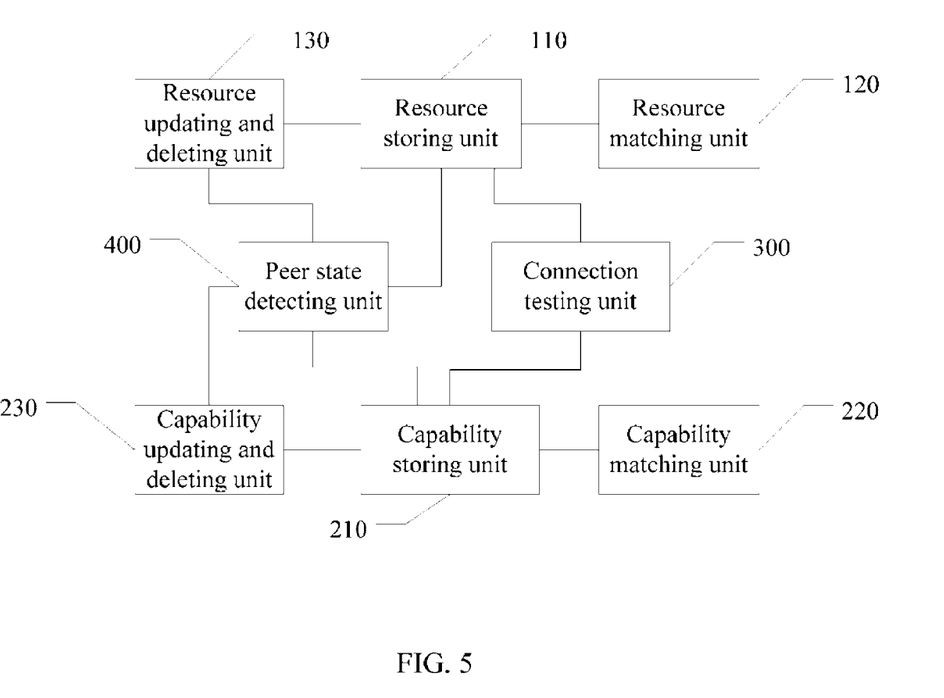
FIG. 5 is a structural diagram of a peer in a P2P network according to an embodiment of the present invention.

FIG. 5 is a structural diagram of a peer in a P2P network according to an embodiment of the present invention.

The peer is selected from or added in a same class of peers. The peer includes (1) a resource storing unit 110, adapted to receive resource registered by peers of a same class, and to store the resource of the peers of the same class and the information of the peers of the same class; (2) a resource matching unit 120, adapted to receive a resource request from the peers of the same class, and to select a peer meeting requirements of the peers of the same class from the resource storing unit and to return the selected peer to the peers of the same class.

If a peer of the peers of the same class requests capability of the peer, the peer further includes (1) a capability storing unit 210, adapted to store capabilities registered by the peers of the same class, and to receive a capability request from the peers of the same class; (2) a capability matching unit 220, adapted to select a peer meeting requirements of the peers of the same class from the capability storing unit and to return the selected peer to the peers of the same class; and (3) a capability updating and deleting unit 230, adapted to update or delete the capabilities of the peers of the same class stored in the capability storing unit.

The peer further includes a connection testing unit 300, adapted to perform a test on the connection between itself and the peers of the same class, and to add those peers passing the test in the resource storing unit and the capability storing unit.

In the processing of downloading resource by the peers of the same class, the peer needs to update the resource in the resource storing unit, and if a peer of the peers of the same class quits the P2P network, said peer deletes resource of the peer stored in the resource storing unit.

The peer further includes a resource updating and deleting unit 130 adapted to update and delete the resource registered by the peers of the same class in the resource storing unit, to update states of the peers of the same class and a user list of the peers of the same class.

The peer further includes a peer state detecting unit 400, adapted to detect the states of the peers of the same class and the peer meeting requirements, and if the peer state detecting unit 400 detects the state of the peer meeting requirements as abnormal, to inform the resource matching unit to select another peer meeting requirements of the peers of the same class and to return the selected peer to the peer user, and to inform the resource updating and deleting unit to update the state of the abnormal peer meeting requirements.

Further, if the peer state detecting unit 400 detects the state of the peers of the same class as abnormal, the peer state detecting unit 400 is adapted to inform the resource storing unit to take back the resource of the peer meeting requirements, to inform the capability storing unit to take back the capability of the peer meeting requirements, and to inform the peer connected with the peers of the same class to disconnection the connection between the peer connected with the peers of the same class and the peers of the same class.

The method and device for establishing a peer-to-peer connection in a P2P network according to embodiments of the present invention are described in detail as above. In the description, particular examples are provided for illustrating the principle and embodiments of the present invention. The above embodiments are merely for facilitating understanding of the method and core of the present invention. Modifications to the embodiments and application field may be made by those skilled in the art within the scope of the present invention. As discussed above, the description should not be understood to limit the scope of the present invention.

The invention claimed is:

1. A method for establishing a peer-to-peer (P2P) connection in a P2P network, comprising:
   receiving a resource request by a management node in the P2P network;
   selecting at least one peer meeting requirements from a resource list and returning the selected at least one peer to a resource request peer by the management node, the resource list being pre-created according to register information of peers other than the management node in the P2P network;
   establishing a connection between the resource request peer and the selected at least one peer meeting the requirements;
   sending a capability exhaustion notification to the management node if a serviceable resource or a capability of the at least one peer meeting the requirements has exhausted;
   ceasing allocating a task to the at least one peer meeting the requirements whose serviceable resource or capability have exhausted and updating the serviceable resource and the capability of the at least one peer meeting the requirements whose serviceable resource or capability have exhausted in the resource list by the management node, in response to receiving the capability exhaustion notification;
   sending a capability resumption notification to the management node after the at least one peer meeting the requirements whose serviceable resource or capability have exhausted resumes the capability; and
   updating by the management node the serviceable resource and the capability of the at least one peer meeting the requirements whose serviceable resource or capability have exhausted in the resource list, in response to receiving the capability resumption notification.

2. The method for establishing a peer-to-peer connection in a P2P network according to claim 1, further comprising:
   classifying peers in the P2P network; and
   determining the management node in each class of peers.

3. The method for establishing a peer-to-peer connection in a P2P network according to claim 1, wherein a first and a second peers having high trust scores in the P2P network are designated, respectively, as a primary management node and a backup management node.

4. The method for establishing a peer-to-peer connection in a P2P network according to claim 1, wherein the creation of the resource list comprises:
   obtaining by the management node the register information of the peers other than the management node, the register information comprising a shared resource, a capability, and IP addresses of the peers; and performing a test on a connection between the management node and the peers having the IP addresses, and adding a peer passing the test in the resource list.

5. The method for establishing a peer-to-peer connection in a P2P network according to claim 1, further comprising updating by the management node capability information of the selected at least one peer meeting the requirements in the resource list, after selecting at least one peer meeting the requirements from a resource list and returning the selected peer to the resource request peer by the management node.

6. The method for establishing a peer-to-peer connection in a P2P network according to claim 1, further comprising:
    detecting by the management node a state of the at least one peer meeting the requirements and a state of the resource request peer; and
    if the state of the at least one peer meeting the requirements is detected as abnormal, selecting another peer meeting the requirements from the resource list and returns the another peer to the resource request peer and updating the state of the at least one peer having the abnormal state;
    if the state of the resource request peer is detected as abnormal, taking back the shared resource and the capability of the at least one peer meeting the requirements and informing all peers connected with the abnormal resource request peer to disconnect the connection between the peers connected with the abnormal resource request peer and the abnormal resource request peer.

7. The method for establishing a peer-to-peer connection in a P2P network according to claim 1, further comprising:
    updating by the management node a resource and a capability of the resource request peer in the resource list, after the resource request peer completes resource downloading; and
    after a peer of the P2P network quits the network, deleting information of the peer that quits the network from the resource list and updating a user list by the management node.

8. A peer device in a Peer-to-Peer (P2P) network, comprising:
    a register information obtaining unit, adapted to receive register information of peers other than the peer device in the P2P network;
    a resource list creating unit, adapted to create a resource list according to the register information, the resource list comprising resource information and capability information of the peers;
    a message receiving unit, adapted to receive a resource request from a resource request peer;
    a resource selecting unit, adapted to select at least one peer meeting requirements from the resource list and to return the selected at least one peer to the resource request peer;
    means for sending a capability exhaustion notification to the management node if a serviceable resource or a capability of the at least one peer meeting the requirements has exhausted;
    means for ceasing allocating a task to the at least one peer meeting the requirements whose serviceable resource or capability have exhausted and updating the serviceable resource and the capability of the at least one peer meeting the requirements whose serviceable resource or capability have exhausted in the resource list by the management node, in response to receiving the capability exhaustion notification;
    means for sending a capability resumption notification to the management node after the at least one peer meeting the requirements whose serviceable resource or capability have exhausted resumes the capability; and
    means for updating by the management node the serviceable resource and the capability of the at least one peer meeting the requirements whose serviceable resource or capability have exhausted in the resource list, in response to receiving the capability resumption notification.

9. The peer device in a P2P network according to claim 8, further comprising:
    a user list obtaining unit, adapted to obtain a user list in the P2P network; and
    a connection testing unit, adapted to perform a test on a connection between the connection testing unit and peers in the user list and to add a peer passing the test in the resource list.

10. The peer device in a P2P network according to claim 9, further comprising:
    an information management unit, adapted to update resource and capability information of a peer in the resource list according to the state of the peer; and
    a peer state detecting unit, adapted to detect a state of the at least one peer meeting the requirements and a state of the resource request peer,
    if the peer state detecting unit detects the state of the at least one peer meeting the requirements as abnormal, to inform the resource selecting unit to select another peer meeting the requirements and to return the selected another peer to the resource request peer, and
    if the peer state detecting unit detects the state of the resource request peer as abnormal, to inform the information management unit to take back and update the capability of the at least one peer meeting the requirements.

11. The peer device in a P2P network according to claim 8, further comprising:
    a peer state detecting unit, adapted to detect the state of the peer meeting the requirements and the state of the resource request peer,
    if the peer state detecting unit detects the state of the peer meeting the requirements as abnormal, inform the resource selecting unit to reselect a peer meeting the requirements and returns the reselected peer to the resource request peer,
    if the peer state detecting unit detects the state of the resource request peer as abnormal, inform the information management unit to take back and update the capability of the peer meeting the requirements.

12. A peer device in a Peer-to-Peer (P2P) network, wherein the P2P network has a peer class including the peer device and a plurality of other peers, the peer device further comprising:
    a resource storing unit, adapted to receive a resource registered by the plurality of other peers of the peer class rather than the peer device, and to store the resource of the plurality of other peers of the peer class and information of the plurality of other peers of the peer class;
    a resource matching unit, adapted to receive a resource request from a resource request peer of the peer class, to select a peer meeting requirements of the resource request from the resource storing unit and to return the selected peer to the resource request peer of the peer class;
    a peer state detecting unit, adapted to detect a state the peer meeting the requirements and a state of the resource request peer,
    if the peer state detecting unit detects a state of the peer meeting the requirements as abnormal, to inform the resource matching unit and the capability matching unit to select another peer meeting the requirements and to return the another peer to the request peer, to inform the resource updating and deleting unit to update the state and the resource of the abnormal peer meeting the requirements and to inform the capability updating and deleting unit to update the capability of the abnormal peer meeting the requirements, and if the peer state detecting unit detects the state of the resource request peer as abnormal, the peer state detecting unit is adapted to inform the resource storing unit to take back the resource of the peer meeting the requirements, to inform the capability storing unit to take back the capability of the peer meeting the requirements, and to inform the peer meeting the requirements connected with the plurality of other peers of the peer class to disconnect the connection between the plurality of other peers of the peer class and the peer connected with the plurality of other peers of the peer class.

13. The peer device in a P2P network according to claim 2, further comprising:

a capability storing unit, adapted to store capabilities registered by the plurality of peers of the peer class and to receive a capability request from the resource request peer;

a capability matching unit, adapted to select a peer meeting the requirements of the capability request from the capability storing unit and to return the selected peer to the resource request peer; and a capability updating and deleting unit, adapted to update and delete the capabilities of the plurality of other peers of the peer class stored in the capability storing unit.

14. The peer device in a P2P network according to claim 13, further comprising:

a connection testing unit, adapted to perform a test on connections between the connection testing unit and the plurality of other peers of the peer class, and to add a peer passing the test in the resource storing unit and the capability storing unit.

15. The peer device in a P2P network according to claim 14, further comprising:

a resource updating and deleting unit, adapted to update and delete the resource registered by the plurality of other peers of the peer class in the resource storing unit, to update a state of the plurality of other peers of the peer class and a user list of the plurality of other peers of the peer class.

* * * * *